US005494310A

United States Patent [19]

Soles

[11] Patent Number: 5,494,310
[45] Date of Patent: Feb. 27, 1996

[54] IMPROVED TOWING APPARATUS

[76] Inventor: Dwayne Soles, 5942 Cayman Cir., West Palm, Fla. 33407-1852

[21] Appl. No.: 96,291

[22] Filed: Jul. 26, 1993

[51] Int. Cl.⁶ ..................................................... B60D 1/14
[52] U.S. Cl. .......................................... 280/450; 280/493
[58] Field of Search ................................ 280/446.1, 449, 280/450, 480, 492–494, 504; 244/17.17, 50

[56] References Cited

U.S. PATENT DOCUMENTS

| | | | |
|---|---|---|---|
| 3,197,238 | 7/1965 | Goddard | 280/494 |
| 3,995,878 | 12/1976 | Geraci et al. | 280/503 X |
| 4,269,429 | 5/1981 | Eichstadt | 280/503 |

Primary Examiner—Margaret A. Focarino
Assistant Examiner—Victor E. Johnson

[57] ABSTRACT

A towing apparatus for releasable securement between a wheel, or wheel gear, or wheel support structure, of an object-to-be-towed and a towing vehicle. A hitch connection is releasably secured to an elongated, resiliently bendable draft member at one end, and to an adjustable torque engaging member at the other end. A breakaway sleeve is secured to the bendable draft member in proximity to the torque engaging member. A breakaway support member having upper and lower bracing bars is pivotally secured to the breakaway sleeve, to provide arcuate travel of the bendable draft member. Limit stops extend between braces, to limit the arcuate travel of the bendable draft member to not more than 30 degrees. An expandable yoke is secured to the upper and lower bracing bars to provide an apparatus to releasably secure the towing apparatus to the object-to-be-towed.

20 Claims, 2 Drawing Sheets

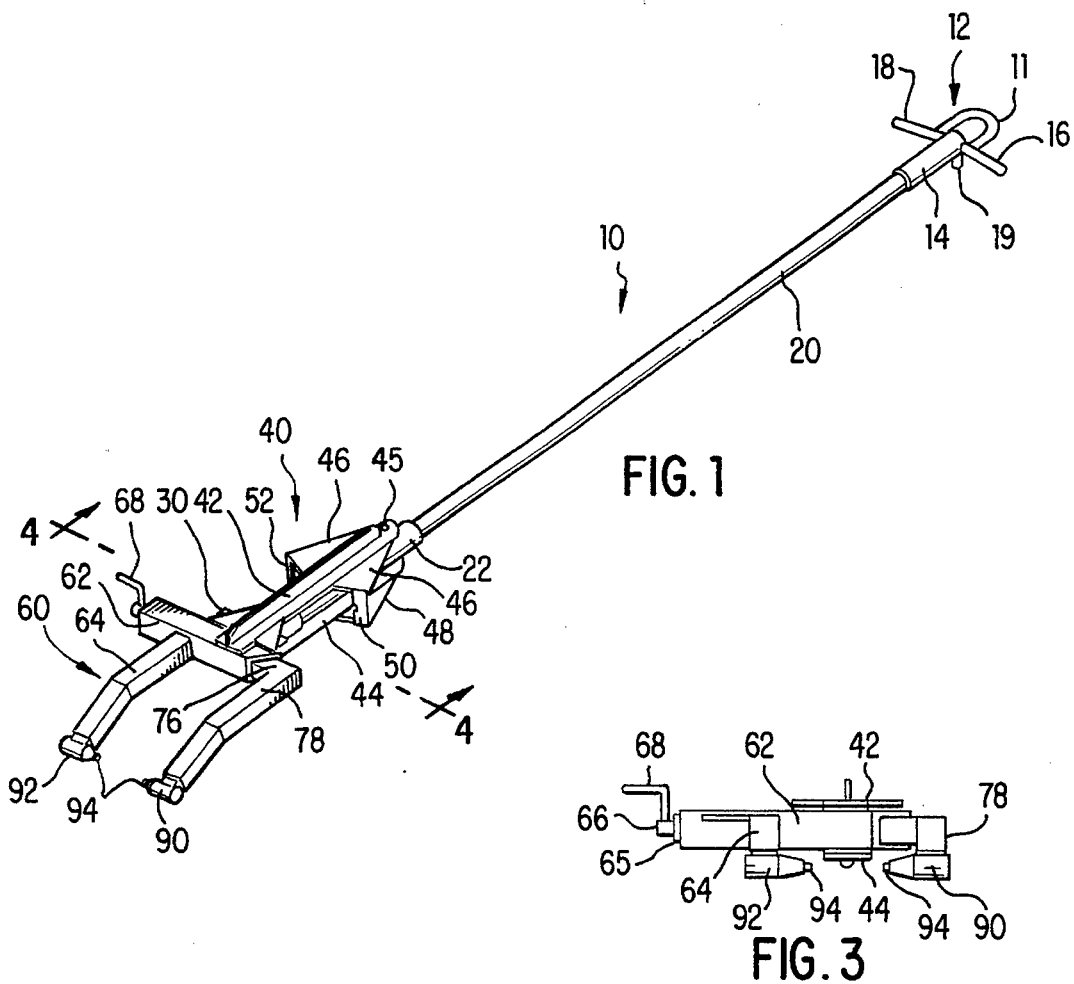
FIG. 1
FIG. 3
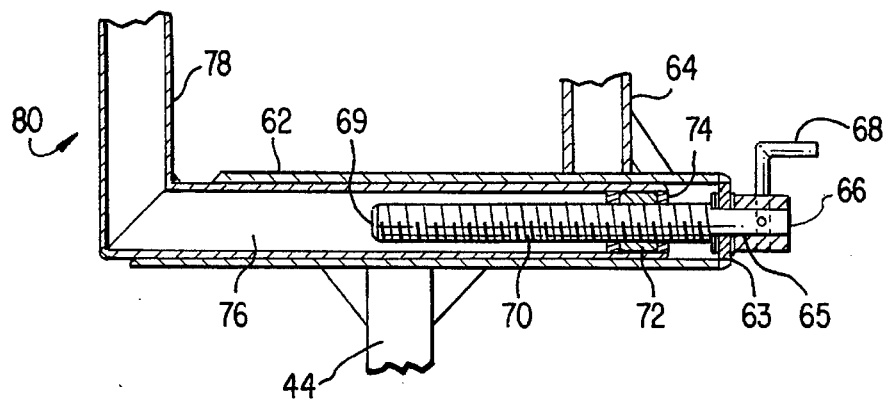
FIG. 5

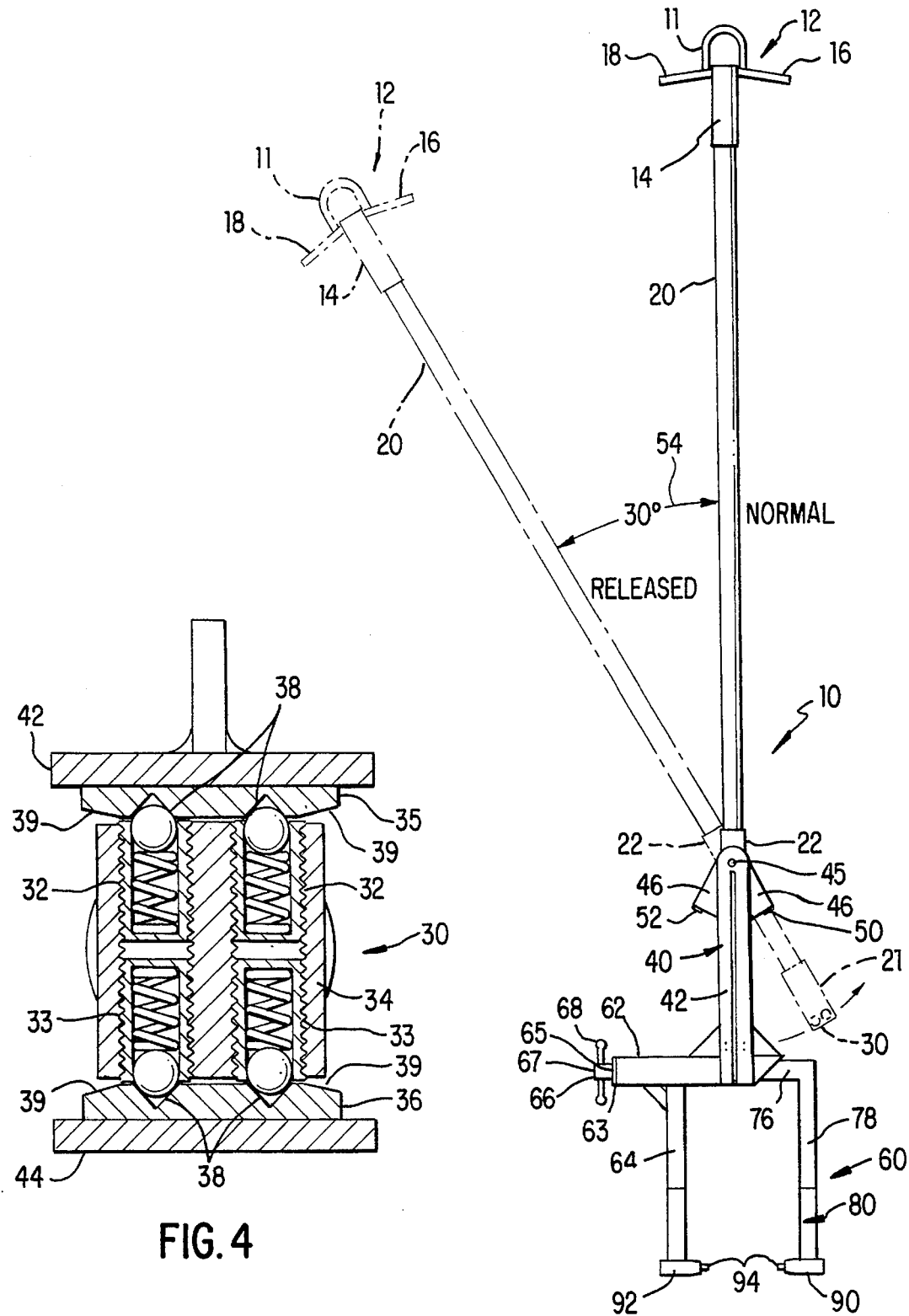

IMPROVED TOWING APPARATUS

BACKGROUND OF THE INVENTION

An object-to-be-towed, such as aircraft, baggage carts, cargo carriers, portable stairs, and other apparatus having wheels, often have to be transported, maneuvered and positioned quickly and with a minimum of manual effort. Towing vehicles are commercially available to transport the apparatus, but currently available hitching apparatus is difficult to manufacture, easily damaged, heavy, awkward to use, and presents a hazard to the object being towed if not properly handled. The arcuate travel of existing breakaway towing devices known in the art is not limited, and thus the towing apparatus may buckle during turning.

Therefore, what is needed is an improved towing apparatus for releasable securement between a wheel of an object-to-be-towed, and a towing vehicle, which will flex but not buckle, and which limits the arcuate travel of the breakaway towing apparatus.

U.S. Pat. No. 3,004,773 by Fred Ankemey, issued Oct. 17, 1961 is representative of the art of breakaway hitches. Once the rollers breakaway from the notch provided, the hitch is free to buckle up to ninety degrees in horizontal travel in either direction. This may cause the object being towed to collide with the towing vehicle, and can cause serious damage to the wheel and gear of the object to be towed. The tubular draft tongue of Ankemey's invention is rigid, and thus subject to damage if bent or deflected during use. The single tension spring and tension means provides no safety factor should they become damaged during use. The user may easily override the breakaway feature by tightening bolt 85 to overcome this safety feature.

SUMMARY OF THE INVENTION

The present invention is directed to a new and improved towing apparatus, which has an elongated, resiliently bendable draft member. A hitch connection is secured to one end of the bendable draft member, and an adjustable torque engaging member is secured to the opposite end of the bendable draft member. A breakaway sleeve is secured to the bendable draft member in proximity to the torque engaging member.

A breakaway support means has upper and lower bracing bars which extend above and below the breakaway sleeve. The upper and lower bracing bars are pivotally secured to the breakaway sleeve, to provide arcuate movement of the bendable member in relation to the breakaway support means.

Limit stops are secured to the breakaway support means to limit the arcuate travel of the bendable member, preferably to limit horizontal arcuate travel beyond 30 degrees in either direction.

Spring biased spherical balls are adjustably secured in a housing of the adjustable torque engagement member, to engage upper and lower grooves positioned to receive a portion of the spherical balls when the axis of the bendable draft member is axially aligned with the bracing bars of the breakaway support member.

An expandable yoke means includes a first, fixed base member secured to the breakaway support member with a fixed arm extending substantially perpendicular to the first base member A second movable base member is adjustably positioned in relation to the first, fixed base member. The movable base member includes a movable arm extending substantially perpendicular to the second base member. A rotatable handle adjustably positions the movable base member in relation to the fixed base member, to adjustably position and secure the expandable yoke means about a wheel, wheel gear, or wheel support structure, of the apparatus to be towed.

A first engaging means is secured substantially perpendicular to the distal end of the fixed arm, and a second engaging means is secured in opposing axial alignment to the first engaging means on the distal end of the movable arm, and aligned to engage the axis of the wheel, or to engage the gear that holds the wheel, or to the wheel support structure, to releasably secure the towing apparatus to the vehicle to be towed.

The bendable draft member enables the towing apparatus to absorb shocks and abuse not possible with a rigid construction taught in the prior art, and the resilient nature of the bendable draft member allows the towing apparatus to return to its normal configuration when the torque on the bendable draft member is relieved.

The breakaway feature enables the user to manipulate the apparatus to be towed without fear of damaging the object being towed. The adjustable torque feature enables the breakaway torque to be pre-set according to the size and weight of the object-to-be-towed, and when the spherical balls are aligned in the grooves, the torque cannot be easily changed by the user of the vehicle.

Multiple spherical balls provide an important safety feature by providing redundancy to assure that the breakaway feature will function even when one of the spherical balls is damaged or removed. Damage to a single spherical ball would reduce the torque required to actuate the breakaway feature, but the breakaway feature would still work. Catastrophic failure of the breakaway feature would be required for the breakaway feature to totally fail.

DESCRIPTION OF THE DRAWINGS

The above mentioned and other features and objects of this invention will become more apparent and the invention itself will be best understood by reference to the following description of the invention taken in conjunction with the accompanying drawings, wherein:

FIG. 1 is a perspective view of the towing apparatus of the invention.

FIG. 2 is a top view of the towing apparatus, showing the bendable draft member in axial alignment with the breakaway support in solid lines, and further showing the bendable draft member in a maximum 30 degree offset axial alignment with the breakaway support shown in dashed lines.

FIG. 3 is an end view of the towing apparatus, showing the rotating handle used to adjustably position the expandable yoke means.

FIG. 4 a sectional view of the adjustable torque engaging member positioned in grooves formed in upper and lower plates secured to the upper and lower bracing bars of the breakaway support member.

FIG. 5 is a sectional view of the movable and fixed yokes, enabling the movable yoke to be adjustably positioned in relation to the fixed yoke.

DESCRIPTION OF THE PREFERRED EMBODIMENT

As shown in FIG. 1, the towing apparatus of this invention 10 comprises a hitch connection means 12, preferably having a U-shaped member 11 secured at the ends to a suitable hitch sleeve 14. For ease of handling, opposing handles 16, 18 may also be secured to the hitch sleeve 14. Handles 16, 18 enable the user to easily lift and position the hitch connection means 12 into position over the hitch on the towing vehicle (not shown).

An elongated, resilient, bendable draft member 20 is secured at one end 19 to the hitch connection means 12. Preferably, the bendable draft member 20 is fiberglass to provide a resilient, bendable draft member 20. The bendable draft member 20 may be any suitable cross sectional configuration, such as round or square, rectangular, etc., and may be a solid shaft or of tubular configuration, to suit manufacturing preference, and the weight of the anticipated load.

The bendable draft member 20 is preferably secured to the hitch sleeve 14 with epoxy and rivets. Other component parts of this invention may be secured together with epoxy, rivets, bolts, or other suitable fastening means known in the art, or may be welded to suit manufacturing preference and the types of material used.

The opposite end 21 of the resilient, bendable draft member 20 is secured to an adjustable torque engaging means 30, best shown in FIG. 5. A breakaway sleeve 22 is secured to the bendable draft member 20 in proximity to the torque engaging means 30.

A breakaway support means 40 comprises upper and lower bracing bars 42, 44 which extend above and below the breakaway sleeve 22. A pin 45 pivotally secures the upper and lower bracing bars 42, 44 to the breakaway sleeve 22. Braces 46, 48 extend from the upper and lower bracing bars 42, 44 to support limit stops 50, 52 which are positioned to limit the arcuate travel of the bendable draft member 20 in relation to the breakaway support means 40.

Preferably, the limit stops 50, 52 limit the horizontal arcuate travel 54 of the bendable member to not more than 30 degrees beyond axial alignment in either direction. (See FIG. 2).

The breakaway support means 40 also includes various stiffeners and braces to provide additional strength as required by the loads to be transported, the use of braces and stiffeners are well known in the art, and thus not further detailed herein.

An expandable yoke means 60 comprises a first fixed base member 62 secured to the ends of the upper and lower bracing bars 42, 44. The first fixed base member 62 preferably is of square or rectangular tubular configuration. One end of the fixed base member 62 is preferably covered with a plate 63, with an aperture 65 through the plate 63. The aperture 65 is sized to rotatably secure a rod 66 therethrough. One end 67 of the rod 66 is secured to a handle 68. Thus, when the handle 68 is turned, rod 66 is also turned.

The distal end 69 of rod 66 is threaded 70 to threadably engage a bushing 72 secured to one end 74 of a movable base member 76. The movable base member 76 is preferably slidably received within the first fixed base member 62, and configured to resist substantial rotation. A movable arm 78 is secured approximately perpendicular to the movable base member 76, to form an expandable yoke means 80, as best shown in FIG. 5. A fixed arm 64 is secured approximately perpendicular to the fixed base member 62 as best shown in FIG. 1. The fixed arm 64 and movable arm 78 may be inclined, as shown in FIG. 1, to raise the towing apparatus 10 further from the ground.

A first engaging means 90 is secured substantially perpendicular to the distal end of the movable arm 78. A second engaging means 92 is secured substantially perpendicular to the distal end of the fixed arm 64 in opposing axial alignment with the first engaging means 90. The first and second engaging means 90, 92 are aligned to releasably secure the hitch apparatus 10 to the movable wheel, or to the gear, or to the wheel support structure, of the object to be towed. Preferably, the first and second engaging means 90, 92 have spring loaded ends 94, and may include additional pins or slots (not shown) to releasably secure the towing apparatus 10 to various movable wheel or gear configurations.

Various attachments (not shown) may be adapted to be releasably secured to the first and second engaging means 90, 92, to suit various wheel, gear or wheel support configurations, to enable the towing apparatus 10 releasably engage the object to be towed.

Referring now to the sectional view of the adjustable torque engaging means 30 shown in FIG. 4, upper and lower plates 35, 36 are secured in opposing alignment to the upper and lower bracing bars 42, 44. Grooves 38 are formed or machined into the upper and lower plates 35, 36 to receive a portion of the spherical ball assemblies 32, 33 which are adjustably secured within housing 34.

The torque required to depress the spherical ball assemblies 32, 33 is shared by the upper and lower spherical ball assemblies 32, 33 to provide redundancy and thus improve safety. A slot in the ball end of each of the spherical ball assemblies, allows adjustment of the spherical balls within the housing 34. The spherical balls are biased by an internal spring to provide the desired loading on the spherical balls. The spherical ball assemblies 32, 33 are well known in the art, and thus not further detailed herein.

Preferably, the opposing plates 35, 36 are tapered 39 on the outer sides in proximity to the outer edges of the grooves 38, to provide an inclined path for the spherical balls as they return from a breakaway position shown in dashed lines in FIG. 2, to the solid line axial alignment also shown in FIG. 2. The inclined path reduces damage to the spherical ball assemblies 32, 33 during the transition between engagement and disengagement of the spherical ball assemblies within the grooves 38. The grooves 38 are preferably hardened to Rockwell Hardness of 45 to 55.

In operation of the towing apparatus 10 disclosed herein, the hitch connection means 12 of the towing apparatus 10 is placed over the hitch on the towing vehicle, and the expandable yoke means 60 is positioned in proximity to the wheel, or the gear portion of the wheel assembly, or to the wheel support structure, of the object to be towed.

The expandable yoke means 60 is raised to position the first and second engaging means 90, 92 in axial alignment with the wheel of the object-to-be-towed. Handle 68 is rotated to engage and releasably secure the wheel engaging means 90, 92 to the axle of the wheel, or to the gear portion of the wheel assembly, or to the wheel support structure, of the object-to-be-towed. Preferably, the first and second engaging means 90, 92 have spring loaded wheel or gear engaging ends 94. Once secured, the towing vehicle may push or pull the towing apparatus 10 to transport and position the object-to-be-towed.

Alternately, the towing apparatus 10 may first be releasably secured to the object-to-be-towed, and then releasably secured to the hitch on the towing apparatus.

Once installed, the user may push, pull and turn the object-to-be-towed, without fear of damaging the towing apparatus or the object-to-be-towed. The bendable draft member will flex to absorb sudden shocks caused by potholes, curbs, rubble, uneven pavement, etc. Should the forces exceed the adjustable torque generated by the spherical ball assemblies 32, 33, the spherical balls will unseat from the grooves 38, and the bendable draft member will be free to rotate in an arcuate path about pin 45 as best shown in FIG. 2.

The limit stops 50, 52 serve to limit the arcuate travel of the bendable draft member 20, thus avoiding the buckling of the towing apparatus 10. This feature protects the object-to-be-towed, as well as the wheel and wheel gears of the object-to-be-towed.

To reseat the spherical ball assemblies 32, 33 in the grooves 38 provided, the user simply reverses direction of the towing vehicle, or turns the wheel of the towing vehicle to reposition the bendable draft member 20 back into axial alignment with the bracing bars 42, 44. The inclined surfaces 39 shown in FIG. 4 serve to ease the transition between alignment and breakaway positions shown in FIG. 2. It takes less torque to reset to alignment then it does to move from alignment to the breakaway position, due to the inclined surfaces 39, shown in FIG. 4.

As long as the torque limit is not exceeded, the towing apparatus will provide a reliable means to transport, maneuver and position an object-to-be-towed over a variety of terrain.

When the torque limit is exceeded, the breakaway support means 40 will release the bendable draft member 20 before damage occurs to the towing apparatus or the object-to-be-towed.

Thus, while the improved towing apparatus has been fully described and disclosed, numerous modifications will become apparent to one of ordinary skill in this art, and such adaptations and modification are intended to be included within the scope of the following claims.

I claim:

1. A towing apparatus for releasable securement between an object-to-be-towed and a towing vehicle, which comprises:

a) a hitch connection means for releasable securement to the towing vehicle;

b) an elongated, resiliently bendable draft member having first and second ends, the first end secured to the hitch connection means; and the second end of the bendable draft member secured to an adjustable torque engaging member, the bendable draft member further secured through a breakaway sleeve in proximity to the second end and to the torque engaging member;

c) a breakaway support member having upper and lower bracing bars with one end of the upper and lower bracing bars pivotally secured to the breakaway sleeve above and below the second end of the bendable member for arcuate movement therebetween; the bracing bars having limit stops to restrict the arcuate movement of the bendable draft member in relation to the breakaway support member;

d) an expandable yoke means having a first base member perpendicular to a fixed arm; and a second base member perpendicular to a movable arm, the first base member secured to the opposite end of the bracing bars, and the second base member adjustably positioned in relation to the first base member to selectively expand and retract the movable arm in relation to the fixed arm in substantially parallel alignment;

e) a towed vehicle engaging means, with a first engaging means secured to the fixed arm of the expandable yoke means, and a second engaging means secured to the movable arm of the expandable yoke means, wherein the expandable yoke means is selectively extended and retracted to releasably secure the first and second engaging means to the object-to-be-towed.

2. The apparatus of claim 1, wherein the resiliently bendable draft member is an elongated fiberglass tube.

3. The apparatus of claim 1, wherein the resiliently bendable draft member is an elongated fiberglass rod.

4. The apparatus of claim 1, wherein the adjustable torque engagement member comprises at least one set of opposing, spring biased spherical balls adjustably positioned in an enclosure secured to the second end of the elongated resiliently bendable draft member, with at least one set of upper and lower elongated grooves disposed between the upper and lower bracing bars, the elongated grooves positioned to receive the spring biased spherical balls, when the bendable member is in axial alignment with the upper and lower bracing bars, and to provide breakaway release of the spring biased spherical balls, when the torque on the bendable member exceeds the combined pressure of the spring biased spherical balls in the elongated grooves.

5. The apparatus of claim 4, wherein two sets of opposing, spring biased spherical balls are adjustably positioned in the enclosure, and two sets of upper and lower elongated grooves are positioned to receive the spherical balls, when the bendable member is in axial alignment with the upper and lower bracing bars.

6. The apparatus of claim 4, wherein the upper elongated groove is machined into a plate having an upper grooved surface, outer sides and ends, with the upper grooved surface tapered in proximity to the groove towards the outer sides of said plate, and the lower elongated groove is machined into an opposing plate having a lower grooved surface, outer sides and ends, with the lower grooved surface tapered from proximity to the groove towards the outer sides of said plate.

7. The apparatus of claim 6, wherein the upper and lower elongated grooves are each hardened to a rockwell hardness range of 45 to 55.

8. The apparatus of claim 1, wherein the bracing bar limit stops are positioned to provide up to 30 degree arcuate travel of the bendable member to either side of the bracing bars of the breakaway support member.

9. The apparatus of claim 1, wherein the hitch connection means is a U-shaped bar, with the ends of the U-shaped bar secured to a hitch sleeve which is secured to the first end of the bendable member.

10. The apparatus of claim 9, wherein the hitch connection means includes handles extending from opposing sides of the hitch sleeve to aid in manually positioning the hitch connection means.

11. The apparatus of claim 9, wherein the hitch connection means includes a pin stop, secured beneath the hitch sleeve to support the hitch connection off the ground when the towing apparatus is not secured to the towing vehicle.

12. The apparatus of claim 1, wherein a portion of the movable arm is slidably received within the fixed arm of the expandable yoke member, and the movable arm is threadably engaged by a rod rotatably secured through a closed end of the of the fixed arm to a rotatable handle means, wherein rotation of the handle means selectively extends and retracts the movable arm of the expandable yoke member.

13. The apparatus of claim 1, wherein said towed vehicle wheel engaging means further comprises first and second engaging means having spring loaded engaging ends.

14. A towing apparatus for releasable securement between an object-to-be-towed and a towing vehicle, which comprises:

a) a hitch connection means;

b) an elongated, fiberglass draft member having a first end and a second end; the hitch connection means secured to the first end of the fiberglass draft member;

c) an adjustable torque engaging member secured to the second end of the fiberglass draft member;

d) a breakaway sleeve secured to the fiberglass draft member in proximity to the torque engaging member;

e) a breakaway support means having upper and lower bracing bars pivotally secured at the second end to the breakaway sleeve above and below the fiberglass draft member for arcuate positioning of the fiberglass draft member in relation to the breakaway support means; the breakaway support means further having limit stops to restrict the arcuate movement of the fiberglass draft member in relation to the breakaway support means;

f) an expandable yoke support means having a fixed yoke and a movable yoke; the fixed yoke having a fixed base secured to the upper and lower bracing bars and a fixed arm extending substantially perpendicular to the fixed base; the movable yoke having a movable base adjustably positioned to selectively extend and retract the movable yoke in relation to the fixed yoke; and h) a first engaging means secured to the fixed yoke, and a second engaging means secured to the movable yoke in opposing axial alignment with the first engaging means.

15. The apparatus of claim 14 wherein the adjustable torque engagement member comprises at least one set of opposing, spring biased spherical ball assemblies adjustably positioned in an enclosure secured to the second end of the fiberglass draft member, with at least one set of upper and lower elongated grooves disposed between the upper and lower bracing bars, the elongated grooves positioned to receive the spring biased spherical ball assemblies, when the fiberglass draft member is in axial alignment with the upper and lower bracing bars, and to provide breakaway release of the spring biased spherical ball assemblies, when the torque on the bendable member exceeds the pressure of the spring biased spherical ball assemblies in the elongated grooves.

16. The apparatus of claim 15, wherein two sets of opposing, spring biased spherical ball assemblies are adjustably positioned in the enclosure, and two set of upper and lower elongated grooves are positioned to receive a portion of the spherical balls, when the fiberglass draft member is in axial alignment with the upper and lower bracing bars.

17. The apparatus of claim 14, wherein the upper elongated groove is machined into a plate having an upper grooved surface, outer sides and ends, with the upper grooved surface tapered in proximity to the groove towards the outer sides of said plate, and the lower elongated groove is machined into an opposing plate having a lower grooved surface, outer sides and ends, with the lower grooved surface tapered from proximity to the groove towards the outer sides of said plate.

18. The apparatus of claim 14, wherein the upper and lower elongated grooves are each hardened to a rockwell hardness range of 45 to 55.

19. The apparatus of claim 14, wherein the hitch connection means comprises a U-shaped bar, with the ends of the U-shaped bar secured to a hitch sleeve secured to the first end of the fiberglass draft member, and opposing handles extend on opposite sides of the hitch sleeve to aid in manually positioning the hitch connection means.

20. A towing apparatus for releasable securement between an object-to-be-towed and a towing vehicle, which comprises:

a) a hitch connection means for releasable securement to the towing vehicle;

b) an elongated, resiliently bendable draft member having first and second ends, the first end secured to the hitch connection means; and the second end secured to a housing of an adjustable torque engaging means, an upper spherical ball assembly and a lower spherical ball assembly, with the upper and lower spherical ball assemblies adjustably secured within the housing of the torque engaging means;

c) a breakaway sleeve secured to the resiliently bendable member in proximity to the adjustable torque engaging means;

d) a breakaway support member having upper and lower bracing bars, with one end of the upper and lower bracing bars pivotally secured to the breakaway sleeve;

e) an expandable yoke means having a first fixed member perpendicular to a fixed arm, and a second movable member perpendicular to a movable arm, the second movable member slidably received within the first fixed member, and adjustably positioned by rotation of a handle extending through the first fixed member to threadably bias a bushing secured to the movable member to adjustably position the expandable yoke means by rotation of the handle; and f) a towed vehicle engaging means, with a first engaging means secured substantially perpendicular the fixed arm of the expandable yoke means, and a second engaging means secured to the movable arm of the movable yoke means, in opposing axial alignment with the first engaging means.

\* \* \* \* \*